(12) United States Patent
Makarskyy et al.

(10) Patent No.: US 10,778,675 B1
(45) Date of Patent: Sep. 15, 2020

(54) COMPUTING SYSTEM FOR AUTHENTICATING USERS OF A SHARED MOBILE COMPUTING DEVICE

(71) Applicant: Allscripts Software, LLC, Raleigh, NC (US)

(72) Inventors: Stanislav Makarskyy, Arlington Heights, IL (US); Ethan O'Brien, Raleigh, NC (US); Mark Plunkett, Libertyville, IL (US); Ankit Singh, Apex, NC (US); Katherine Ernhart, Raleigh, NC (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 285 days.

(21) Appl. No.: 15/994,663

(22) Filed: May 31, 2018

(51) Int. Cl.
*H04L 29/06* (2006.01)

(52) U.S. Cl.
CPC ........ *H04L 63/0861* (2013.01); *H04L 63/083* (2013.01)

(58) Field of Classification Search
CPC ................. H04L 63/0861; H04L 63/083
See application file for complete search history.

(56) References Cited

U.S. PATENT DOCUMENTS

| 7,606,560 | B2 | 10/2009 | Labrou et al. |
| 7,805,606 | B2 | 9/2010 | Birger et al. |
| 2010/0262834 | A1 | 10/2010 | Freeman et al. |
| 2011/0314153 | A1 | 12/2011 | Bathiche et al. |
| 2014/0283135 | A1 | 9/2014 | Shepherd et al. |
| 2016/0027399 | A1 | 1/2016 | Wilde et al. |
| 2016/0072802 | A1* | 3/2016 | Hoyos ............... H04W 12/0605 726/5 |
| 2016/0342979 | A1* | 11/2016 | Joshi ................. G06Q 20/3223 |
| 2019/0021155 | A1* | 1/2019 | Van De Sluis ........ H05B 45/00 |
| 2019/0026643 | A1* | 1/2019 | Muijs .................... H04W 4/029 |
| 2019/0287083 | A1* | 9/2019 | Wurmfeld ............ G06Q 20/102 |

FOREIGN PATENT DOCUMENTS

WO    2017151867 A1    9/2017

OTHER PUBLICATIONS

Kang et al., "ECG Authentication System Design Based on Signal Analysis in Mobile and Wearable Devices", IEEE Signal Processing Letters, vol. 23, Issue: 6, Jun. (Year: 2016).*

* cited by examiner

*Primary Examiner* — Morshed Mehedi
(74) *Attorney, Agent, or Firm* — Medley, Behrens & Lewis, LLC

(57) ABSTRACT

A system for supporting multiple users of a mobile computing device is disclosed herein. The mobile computing device receives a biometric identifier for a user by way of a biometric input component of the mobile computing device. Responsive to receiving the biometric identifier, the mobile computing device causes the biometric identifier to be received by a biometrics subsystem of an operating system of the mobile computing device. The biometrics subsystem authenticates the user based upon the biometric identifier. The mobile computing device then scans for an identifier for a wearable device worn by the user that is emitted from the wearable device. Responsive to detecting the identifier for the wearable device, the mobile computing device authenticates the user based upon the identifier for the wearable device. The mobile computing device then executes a mobile application loaded in memory of the mobile computing device.

20 Claims, 6 Drawing Sheets

COMPUTING SYSTEM FOR AUTHENTICATING USERS OF A SHARED MOBILE COMPUTING DEVICE

BACKGROUND

Conventional mobile computing devices frequently provide biometric authentication functionality to a user, whereby a mobile computing device may cause the user to be authenticated based upon a biometric identifier for the user as opposed to a traditional username and password approach, thus obviating the need for manual input on behalf of the user. For instance, the mobile computing device may include a fingerprint scanner. The user of the mobile computing device may place a finger of the user (e.g., a thumb) on the fingerprint scanner, and the fingerprint scanner may generate a fingerprint scan of the finger. The mobile computing device may then encrypt the fingerprint scan and store the encrypted fingerprint scan in a secure memory location of the mobile computing device, thereby causing the fingerprint to be registered with the mobile computing device. Subsequently, when the user wishes to access an application on the mobile computing device, the user may place the finger on the fingerprint scanner. The fingerprint scanner generates a second fingerprint scan of the finger. The mobile computing device can then authenticate the user based upon the encrypted fingerprint scan and the second fingerprint scan. Responsive to authenticating the user, the mobile computing device can provide the user with access to the application.

Conventional mobile computing devices also include the ability to register multiple fingerprints. For example, a mobile computing device may register a left thumbprint of the user and a right thumbprint of the user. However, there is no requirement that fingerprints registered with the mobile computing device belong to the same user. As such, the ability to register multiple fingerprints has been leveraged by organizations to support biometric authentication for a plurality of users on the same mobile computing device. For instance, if the mobile computing device is to be used by a first user and a second user, the mobile computing device may register fingerprint scans for the first user and the second user. The mobile computing device (and hence applications loaded on the mobile computing device) may then be accessed by the first user when a fingerprint scan for the first user is provided to the mobile computing device. When the first user is not operating the mobile computing device, the mobile computing device may be accessed by the second user when a fingerprint scan for the second user is provided to the mobile computing device.

The conventional approach to biometric authentication on a shared mobile computing device suffers from various deficiencies as most mobile computing devices are intended to be operated by a single user and not a plurality of users. For security purposes, operating systems of mobile computing devices are configured only to generate binary responses (i.e., yes/no) during biometric authentication. Thus, while a mobile computing device can authenticate different users of the mobile computing device based on biometric identifiers, the mobile computing device cannot determine identities of the different users based solely on the biometric identifiers. Therefore, data and application access provided to the different users of the mobile computing device is the same, which is undesirable. Additionally, conventional approaches to biometric authentication in shared computing environments are undesirable in situations in which sensitive data is handled, such as a healthcare environment in which protected patient data may be inadvertently shared.

SUMMARY

The following is a brief summary of subject matter that is described in greater detail herein. This summary is not intended to be limiting as to the scope of the claims.

Disclosed herein are various technologies pertaining to authentication of a user of a computer-executable mobile application executing on a mobile computing device that is shared by multiple users. More specifically, disclosed herein is an authentication module of a mobile application that enables authentication of multiple users of the mobile application on the mobile computing device. The mobile application performs the authentication using a biometric identifier for a user as well as an identifier emitted from a wearable device worn by or on the person of the user. The technologies described herein can be used in a healthcare computing environment in which a mobile computing device is shared among many different healthcare workers.

In operation, a mobile computing device executing a mobile application registers a biometric identifier for a user of the mobile computing device. In an example, the biometric identifier for the user may be a fingerprint scan of a fingerprint of the user. The mobile computing device receives the biometric identifier for the user by way of a biometric input component (e.g., a fingerprint scanner) of the mobile computing device. Responsive to receiving the biometric identifier for the user, a biometrics subsystem of an operating system of the mobile computing device encrypts the biometric identifier and stores the biometric identifier in secure memory of the mobile computing device.

The mobile computing device also registers a wearable device worn by the user. The wearable device includes a short-range communication component (e.g., a Bluetooth transceiver in a smartwatch, a radio frequency identification (RFID) tag, a near field communication (NFC) tag, etc.) that emits an identifier for the wearable device (which may also be considered an identifier for the user). To this end, the user may bring the wearable device in proximity to the mobile computing device. The mobile computing device may then receive input from the user causing a short-range communication component (e.g., Bluetooth transceiver, RFID reader, NFC reader etc.) of the mobile computing device to scan for an identifier for the wearable device (and hence the user) that is emitted or will be emitted (e.g., as a radio-wave) from the short-range communication component of the wearable device. As the wearable device is in proximity to the mobile computing device, the mobile computing device may then detect the identifier for the wearable device that is being emitted. The mobile computing device may then encrypt the identifier for the wearable device and cause the identifier for the wearable device to be stored on the mobile computing device.

Prior to or subsequent to registering the biometric identifier and the wearable device, the mobile computing device may receive input from the user causing a user profile for the user to be created and associated with the identifier for the wearable device stored on the mobile computing device. For example, the user profile may include preferences for the mobile application, data access permissions for the user on the mobile application, etc. In the event that the mobile application is part of a distributed application, the mobile computing device may also receive data from other computing devices (e.g., a server computing device) and use the data in creating the user profile. The above-described registration process may be repeated for different users of the mobile computing device.

Subsequently, it is contemplated that the user wishes to access the mobile application on the mobile computing device and that the user wears the wearable device or has the wearable device on his or her person. As such, the mobile computing device may receive an indication that the mobile application is to be accessed (either as an initial login by the user or a "resume" login by the user after a period of inactivity) as input from the user. Responsive to receiving the indication, the authentication module of the mobile application can receive, by way of the biometric input component of the mobile computing device, a biometric identifier for the user. The authentication module can then cause the biometric identifier to be received by the biometrics subsystem of the operating system of the mobile computing device, whereupon the biometrics subsystem can cause the user to be authenticated based upon the biometric identifier and the encrypted biometric identifier stored in the secure memory of the mobile computing device.

Responsive to authenticating the user, the biometrics subsystem can cause a message to be transmitted to the authentication module indicating that authentication was successful. Responsive to receiving the message, the authentication module may then cause the short-range communication component of the mobile computing device to begin scanning for the identifier for the wearable device that is emitted from the wearable device that was previously registered with the mobile computing device. Responsive to detecting the identifier for the wearable device, the authentication module may authenticate the wearable device (and hence the user) based upon the identifier for the wearable device currently being emitted from the wearable device and the encrypted identifier for the wearable device stored on the mobile computing device. The authentication module may then identify the user profile for the user from amongst a plurality of user profiles stored on the mobile computing device based upon the identifier for the wearable device. The authentication module then causes the mobile application to execute (or resume executing) and provide functionality in accordance with the user profile for the user.

The above-described technologies present various advantages over conventional mobile biometric authentication technologies. First, the above-described technologies enable authentication of different users of a mobile computing device without having to resort to traditional username and password approaches. Second, the above-described technologies increase security of data stored on the mobile computing device by supporting user profiles for different users of the mobile computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
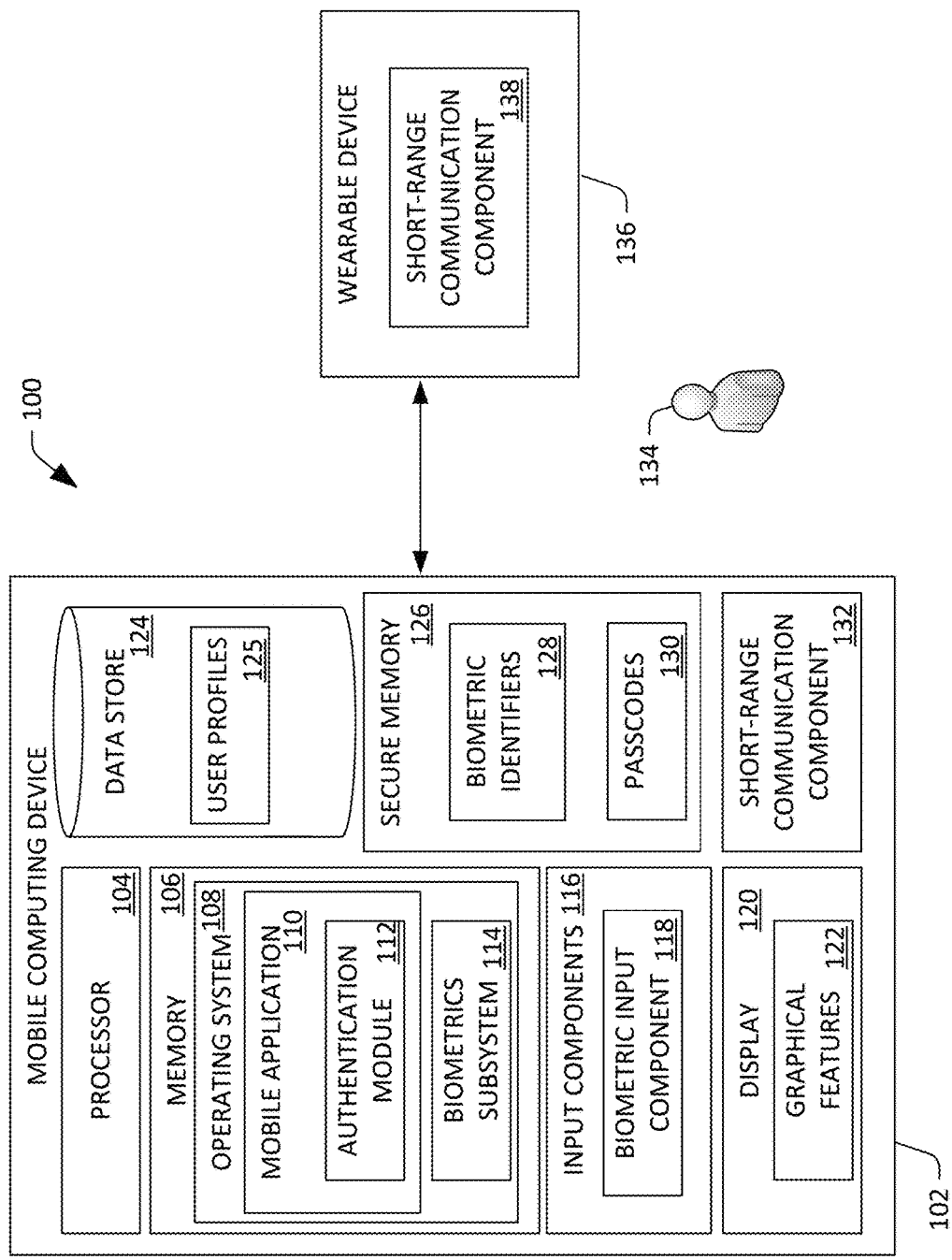
FIG. 1 is a functional block diagram of an exemplary computing system that facilitates authentication of a user of a mobile application executing on a mobile computing device.

Various technologies pertaining to authenticating users of a shared mobile computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference to FIG. 1, an exemplary computing system 100 that facilitates authenticating users of a mobile computing device is illustrated. The computing system 100 includes a mobile computing device 102 operated by a user 134. In a non-limiting example, the mobile computing device 102 may be a tablet computing device or a smartphone.

The mobile computing device 102 includes a processor 104 and memory 106, wherein the memory 106 has an operating system 108 and a computer-executable mobile application 110 loaded therein. The operating system 108 executes the mobile application 110. Additionally, the operating system 108 includes a biometrics subsystem 114. In general, the biometrics subsystem 114 is configured to authenticate the user 134 based on a biometric identifier for the user 134. The mobile application 110 is an application that is utilized by different users of the mobile computing device 102. The mobile application 110 includes an authentication module 112. In general, the authentication module 112 is configured to communicate with the biometrics subsystem 114 of the operating system 108 and a wearable device 136 (described below) in order to authenticate the user 134.

The mobile computing device 102 also includes input components 116 (e.g., mouse, keyboard, touchscreen, etc.) suitable for data input. The input components 116 also include a biometric input component 118 (or several biometric input components). The biometric input component 118 is generally configured to receive a biometric identifier for the user 134 that the authentication module 112 of the mobile application 110 and the biometrics subsystem 114 can subsequently utilize to authenticate the user 134. In an example, the biometric input component 118 may be a fingerprint scanner that is configured to generate a fingerprint scan of a fingerprint of the user 134. In another example, the biometric input component 118 may be a camera that is configured to capture an image of a face of the user 134. In yet another example, the biometric input component 118 may be a microphone that is configured to capture a speech sample of the user 134. In a further example, the biometric input component may be a retinal scanner that is configured to capture a scan of a retina of the user 134.

The mobile computing device 102 may include a display 120, whereupon graphical features 122 can be presented thereon. The mobile computing device 102 can additionally include a data store 124. The data store 124 may comprise user profiles 125 for users of the mobile application 110 on the mobile computing device 102. For instance, a user profile in the user profiles 125 may include preferences for the mobile application 110, data access permissions for the mobile application 110, etc. The mobile computing device 102 may include secure memory 126 that is configured to retain sensitive data. For instance, the secure memory 126 may include encrypted biometric identifiers 128 for a plurality of users of the mobile computing device 102 and encrypted passcodes 130 for the plurality of users of the mobile computing device 102.

The mobile computing device 102 additionally includes a short-range communication component 132 (or several short-range communication components). The short-range communication component 132 is configured to detect an identifier for the wearable device 136 worn by the user 134 that is emitted from the wearable device 136. Therefore, as the wearable device may be worn exclusively by the user 134, the identifier for the wearable device 136 may also be considered as an identifier for the user 134. In a non-limiting example, the short-range communication component 132 may be a Bluetooth transceiver or a radio frequency identification (RFID) reader, such as a near field communication (NFC) receiver or transceiver.

The computing system 100 also includes the wearable device 136 worn by the user 134. The wearable device 136 may also be carried on the person of the user 134. In general, the wearable device 136 is configured to emit an identifier for the wearable device 136 (and hence, the user 134) that can be detected by the short-range communication component 132 of the mobile computing device 102. As such, the wearable device 136 comprises a short-range communication component 138. In a non-limiting example, the short-range communication component 138 may be a Bluetooth transceiver or a RFID tag, such as a NFC tag. In an embodiment, the wearable device 136 may be a wearable computing device, such as a smartwatch. In another embodiment, the wearable device 136 may be a bracelet with the short-range communication component 138 embedded therein. In yet another embodiment, the wearable device 136 may be a keycard including the short-range communication component 138 that can be carried by the user 134 or placed in a wallet or purse of the user 134.

Operation of the computing system 100 is now set forth. It is contemplated that the mobile computing device 102 is a shared device whereby a plurality of users operate the mobile computing device 102 at different times. It is further contemplated that the user 134 wears the wearable device 136 or has the wearable device 136 on his or her person (e.g., in a wallet, purse, etc.).

Prior to authentication, the mobile computing device 102 registers a biometric identifier (e.g., a fingerprint scan) for the user 134. The biometric input component 118 of the mobile computing device 102 receives a biometric identifier for the user 134 as input. Responsive to receiving the biometric identifier, the biometrics subsystem 114 of the operating system 108 may encrypt the biometric identifier and cause the biometric identifier to be stored in the secure memory 126.

Prior to authentication, the mobile computing device 102 also registers the wearable device 136 worn by the user 134. Responsive to receiving an indication from the user 134 as input, the short-range communication component 132 of the mobile computing device 102 can begin to scan for an identifier for the user 134 that is emitted (e.g., as a radio wave) from the short-range communication component 138 of the wearable device 136. The authentication module 112 can receive the identifier for the wearable device 136, and can cause the identifier for the wearable device 136 to be encrypted and stored on the mobile computing device 102 (e.g., in the data store 124, in the secure memory 126, etc.)

Prior to or subsequent to registering the biometric identifier and the wearable device 136, the mobile computing device 102 may receive input from the user 134 causing a user profile for the user 134 to be created and associated with the identifier for the wearable device 136 stored on the mobile computing device 102. For example, the user profile may include preferences for the mobile application 110, data access permissions for the mobile application 110 when the mobile application 110 is utilized by the user 134, etc. The user profile for the user 134 may then be stored in the data store 124 as part of the user profiles 125.

The above described registration processes, as well as the user profile creation process, may be repeated for different users of the mobile computing device 102, such that the mobile computing device 102 retains a biometric identifier, an identifier for a wearable computing device, and a user profile for each of the different users.

Subsequently, it is contemplated that the user 134 wishes to access the mobile application 110 (either as an initial login or a "resume" login after a period of inactivity) on the mobile computing device 102 and that the user 134 wears the wearable device 136 or has the wearable device 136 on his or her person.

The biometric input component 118 of the mobile computing device 102 may receive a biometric identifier for the user 134 as input. The biometric input component 118 can cause the biometric identifier to be received by the authentication module 112 of the mobile application 110. Responsive to receiving the biometric identifier, the authentication module 112 can cause the biometric identifier to be received by the biometrics subsystem 114 of the operating system 108 of the mobile computing device 102, whereupon the biometrics subsystem 114 can authenticate the user 134 based upon the biometric identifier. More specifically, the biometrics subsystem 114 may cause a comparison of the biometric identifier to be performed with a biometric identifier stored in the secure memory 126 during the registration process (described above in FIG. 1). In an example, the biometric identifier matches the biometric identifier stored in the secure memory 126, and the biometrics subsystem 114 can cause a message to be received by the authentication module 112, the message indicating that the biometric identifier has been authenticated. In another example, the biometric identifier does not match the biometric identifier stored in the secure memory 126, and the biometrics subsystem 114 can cause a message indicating that the biometric identifier is invalid to be presented on the display 120 of the mobile computing device 102.

Responsive to receiving the message, the authentication module 112 can cause the short-range communication component 132 of the mobile computing device 102 to scan for an identifier for the user 134 that is being emitted from the short-range communication component 138 of the wearable device 136. Responsive to detecting the identifier for the user 134, the authentication module 112 can authenticate the user 134 based upon the identifier for the user 134. More specifically, the authentication module 112 determines that the identifier for the user 134 (and hence, the wearable device 136) has been previously registered with the mobile computing device 102. Responsive to determining that the identifier for the user 134 has been previously registered, the authentication module 112 also identifies a user profile for the user 134 based upon the identifier for the user 134.

The authentication module 112 may then cause a second message to be received by the mobile application 110, wherein the second message causes the mobile application 110 to execute (or resuming executing) under the user profile for the user 134, thereby causing the mobile application 110 to provide functionality in accordance with the user profile for the user 134.

In the event that the short-range communication component 132 of the mobile computing device 102 detects a second identifier for a second user (e.g., a user that also utilizes the mobile computing device 102) being emitted from a second wearable computing device worn by the second user, the mobile computing device 102 may attempt to resolve the closest wearable device to the mobile computing device 102 based upon received signal strength indicator (RSSI), or a methodology comparable to RSSI. More specifically, the mobile computing device 102 may employ the short-range communication component 132 to make a first measurement of power present in a radio wave corresponding to the identifier for the user 134 being emitted from wearable device 136 that has been received by the short-range communication component 132. The mobile computing device 102 may also make a second measurement of power present in a radio wave corresponding to the identifier for the second user emitted from the second wearable device that has been received by the short-range communication component 132. When the mobile computing device 102 determines that the first measurement is greater than the second measurement, the mobile computing device 102 can identify the user 134 as the intended user and provide functionality in accordance with the user profile for the user 134 (described above). When the mobile computing device 102 determines that the first measurement is less than the second measurement, the mobile computing device 102 can identify the second user as the intended user and provide functionality in accordance with the user profile for the second user.

In the event that RSSI cannot be employed or if the first measurement is within a certain threshold value from the second measurement (e.g., the first measurement differs from the second measurement by less than 5%), the mobile computing device 102 may present a prompt on the display 120 of the mobile computing device 102, wherein the prompt indicates that additional access credentials (e.g., a username and a password) of the user 134 are required in order to disambiguate the user 134 from the second user. The mobile computing device 102 can receive the additional access credentials as input from the user 134, and the mobile computing device 102 can identify a user profile for the user 134 based on the additional access credentials as well as the identifier for the wearable device 136.

Figure 2:
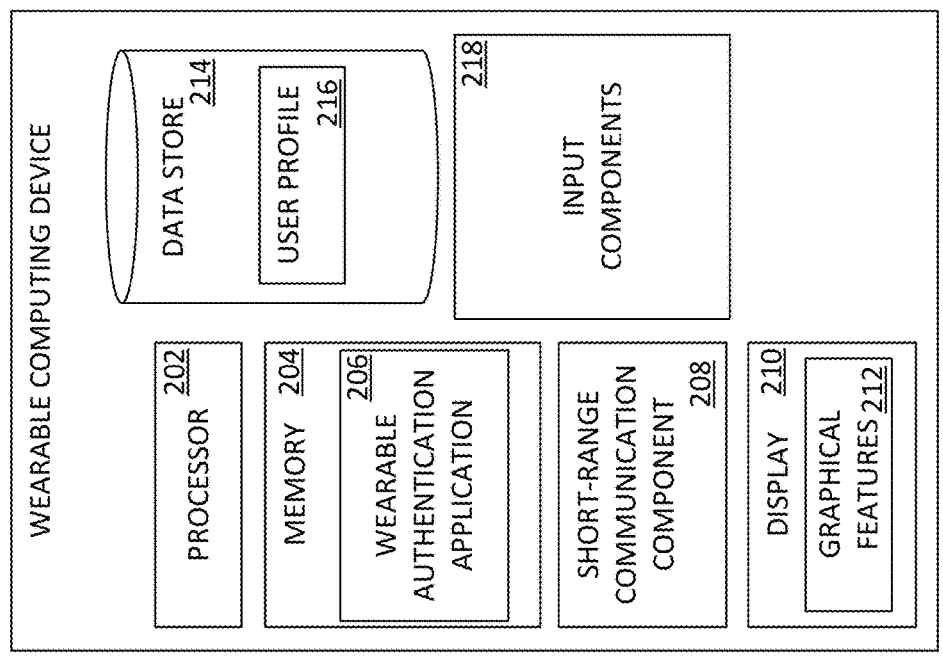
FIG. 2 is a functional block diagram of an exemplary wearable computing device.

Referring now to FIG. 2, an exemplary wearable computing device 200 that can be used in accordance with the technologies presented herein is illustrated. For instance, the wearable computing device 200 may function as the wearable device 136 in the computing system 100 described in FIG. 1. In an example, the wearable computing device 200 may be a smartwatch. The wearable computing device 200 includes a processor 202 and memory 204, wherein the memory 204 has a wearable authentication application 206 loaded therein. In general, the wearable authentication application 206 may be configured to communicate with the mobile application 110 executing on the mobile computing device 102. As such, the wearable computing device 200 comprises a short-range communication component 208 that is configured to emit an identifier for the wearable computing device 200 (and hence the user 134 that wears the wearable computing device 200). In an example, the short-range communication component 208 may be a Bluetooth transceiver or a RFID tag, such as a NFC tag.

The wearable computing device 200 may also include a display 210, whereupon graphical features 212 may be presented thereon. Furthermore, the wearable computing device 200 may include a data store 214. The data store 214 may comprise a user profile 216 for a user of the wearable computing device 200. The wearable authentication application 206 may access data in the user profile 216 and communicate such data to the mobile application 110 executing on the mobile computing device 102 in order to provide a customized experience for the user 134 of the mobile application 110. The wearable computing device 200 additionally includes input components 218. For instance, the input components 218 may include a touchscreen, scroll wheel, etc.

In an embodiment, the input components 218 include a touchscreen, and the wearable authentication application 206 may be configured to receive a gesture (e.g., a double tap) as input on the touchscreen. The gesture may be mapped to a certain programmatic task in the user profile in the user profiles 125 stored the mobile computing device 102 and/or the user profile 216 stored on the wearable computing device 200. The wearable computing device 200 may transmit data based on the gesture to the mobile computing device 102 prior to or concurrently with the mobile computing device 102 detecting the identifier for the wearable computing device 200. After the authentication module 112 causes the authentication of the user 134 based on the biometric identifier for the user 134 and the identifier for the wearable computing device 200, the mobile application 110 may utilize the data received from the wearable computing device 200 to cause a particular context within the mobile application 110 to be automatically opened without further user input.

In another embodiment, the wearable computing device 200 may comprise a health monitoring component (e.g., a blood pressure monitor) that can capture health information (e.g., a blood pressure) of the user 134. The wearable computing device 200 may transmit data (by way of the short-range communication component 208) based upon the health information to the mobile computing device 102. After the authentication module 112 causes the authentication of the user 134 based on the biometric identifier for the user 134 and the identifier for the wearable computing device 200, the mobile application 110 may utilize the data received from the wearable computing device 200 to cause a change in appearance of the mobile application 110 as it is presented on the display 120 without further input by the user 134. For instance, if the health information indicates that the user has a blood pressure that exceeds a particular threshold, the mobile application 110 can utilize a particular color palette in a user interface of the mobile application 110.

Figure 3:
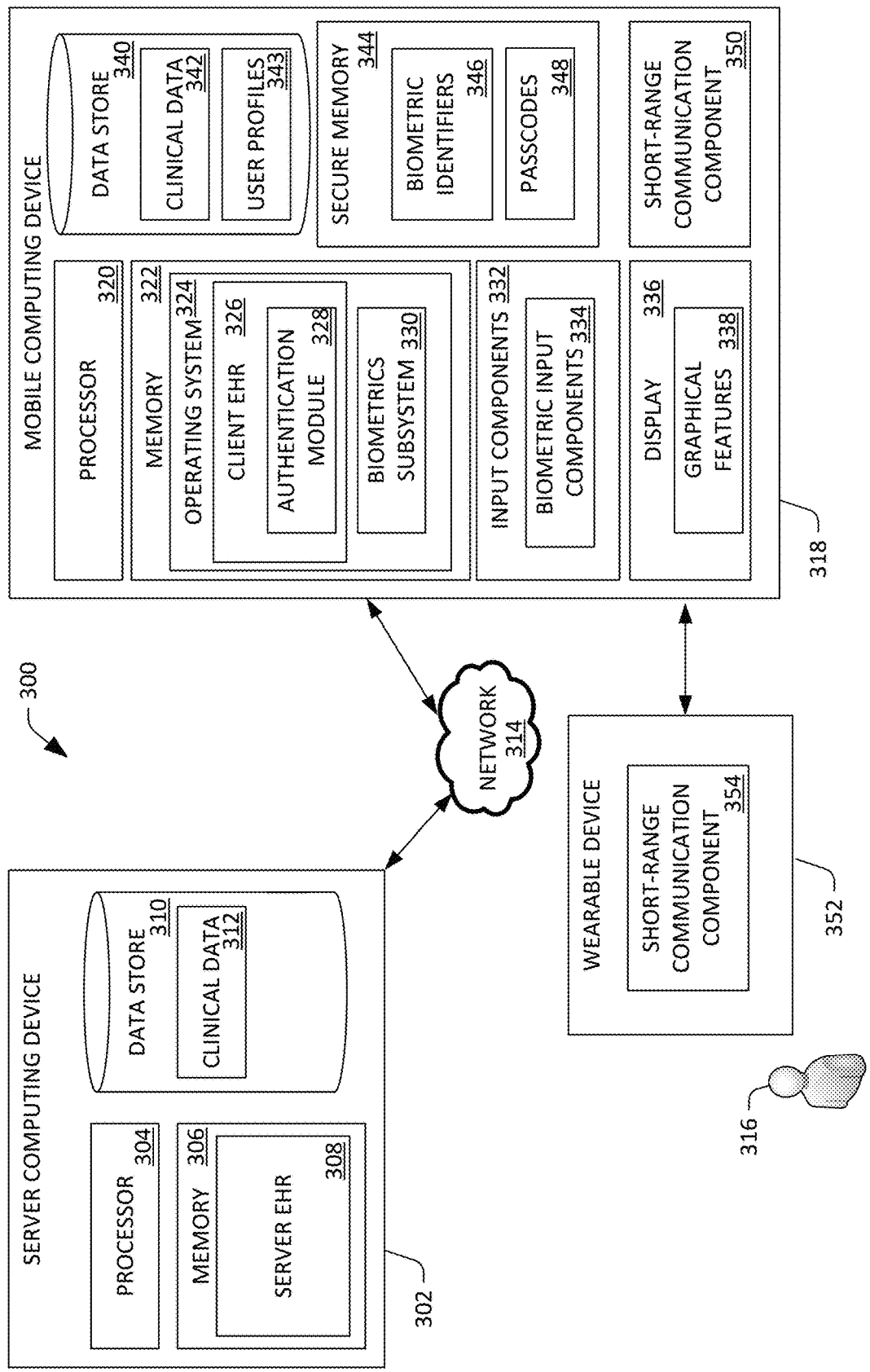
FIG. 3 is a functional block diagram of an exemplary computing system that facilitates authenticating a user of a client electronic health records application.

With reference now to FIG. 3, an exemplary computing system 300 that facilitates authenticating a user of a client electronic health records application (client EHR) that executes on a shared mobile computing device is illustrated. The computing system 300 includes a server computing device 302. The server computing device 302 comprises a processor 304 and memory 306, wherein the memory 306 has a server electronic health records application (server EHR) 308 loaded therein. In general, the server EHR 308 is configured to perform a variety of tasks related to patient healthcare in a healthcare facility (e.g., patient intake, prescription generation, patient record creation and maintenance, etc.). The server computing device 302 also includes a data store 310 that comprises clinical data 312 (amongst other data) about patients, wherein the clinical data 312 is maintained by the server EHR 308. The clinical data 312 can include electronic health records, prescription records, claims data, patient/disease registries data, health surveys data, and/or clinical trials data.

The computing system 300 additionally includes a mobile computing device 318 that is currently operated by a healthcare worker 316. Other healthcare workers also operate the mobile computing device 318 when the mobile computing device 318 is not being operated by the healthcare worker 316. In an example, the mobile computing device 318 may be a tablet computing device or a smartphone. The mobile computing device 318 is in communication with the server computing device 302 by way of a network 314 (e.g., the Internet, intranet, etc.).

The mobile computing device 318 includes a processor 320 and memory 322, wherein the memory 322 has an operating system 324 and a client electronic health records application (client EHR) 326 loaded therein. The operating system 324 executes the client EHR 326. Additionally, the operating system 324 includes a biometrics subsystem 330. In general, the biometrics subsystem 330 is configured to authenticate the healthcare worker 316 based on a biometric identifier for the healthcare worker 316 (e.g., a fingerprint scan). In general, the client EHR 326 is configured to interface with the server EHR 308 executing on the server computing device 302, thereby providing the healthcare worker 316 with access to functionality of the server EHR 308. The client EHR 326 includes an authentication module 328. In general, the authentication module 328 is configured to communicate with the biometrics subsystem 330 of the operating system 324 and the wearable device 352 in order to authenticate the healthcare worker 316.

The mobile computing device 318 also includes input components 332 (e.g., mouse, keyboard, touchscreen, etc.) suitable for data input. The input components 332 also include a biometric input component 334 (or several biometric input components). The biometric input component 334 is generally configured to receive a biometric identifier from the healthcare worker 316 that the authentication module 328 of the client EHR 326 and the biometrics subsystem 330 can utilize to authenticate the healthcare worker 316. In an example, the biometric input component 334 may be a fingerprint scanner that is configured to generate a fingerprint scan of a fingerprint of the healthcare worker 316. In another example, the biometric input component 334 may be a camera that is configured to capture an image of a face of the healthcare worker 316. In yet another example, the biometric input component 334 may be a microphone that is configured to capture a speech sample of the healthcare worker 316. In a further example, the biometric input component may be a retinal scanner that is configured to capture a scan of a retina of the healthcare worker 316.

The mobile computing device 318 may include a display 336, whereupon graphical features 338 can be presented thereon. The mobile computing device 318 can additionally include a data store 340. The data store 340 may comprise clinical data 342 for patients as well as user profiles 343 for healthcare workers that utilize client EHR 326 on the mobile computing device 318. There may be some overlap between the clinical data 312 retained in the data store 310 of the server computing device 302 and the clinical data 342. The mobile computing device 318 may include secure memory 344 that is configured to store sensitive data. For instance, the secure memory 344 may comprise encrypted biometric identifiers 346 for healthcare workers that utilize the client EHR 326 and encrypted passcodes 348 for healthcare workers that utilize the client EHR 326.

The mobile computing device 318 additionally includes a short-range communication component 350. The short-range communication component 350 is configured to detect an identifier for the healthcare worker 316 that is emitted from a wearable device worn by the healthcare worker 316 (described below). In a non-limiting example, the short-range communication component 350 may be a Bluetooth transceiver or a RFID reader, such as a near field communication (NFC) receiver or transceiver.

The computing system 300 also includes a wearable device 352 worn by the healthcare worker 316. In general, the wearable device 352 is configured to emit an identifier for the wearable device 352 that can be detected by the short-range communication component 350 of the mobile computing device 318. As it is contemplated that the wearable device 352 is worn only by the healthcare worker 316, the identifier for the wearable device 352 may also serve as an identifier for the healthcare worker 316. To this end, the wearable device 352 comprises a short-range communication component 354. In a non-limiting example, the short-range communication component 354 may be a Bluetooth transceiver or a RFID tag, such as a NFC tag. In an embodiment, the wearable device 352 may be a wearable computing device, such as a smartwatch. In another embodiment, the wearable device 352 may be a bracelet with the short-range communication component 354 embedded therein. In yet another embodiment, the wearable device 352 may be a card that can be carried by the healthcare worker 316.

Operation of the computing system 300 is now set forth. It is contemplated that a biometric identifier for the healthcare worker 316 and an identifier for the wearable device 352 worn by the healthcare worker 316 have been registered with mobile computing device 318 using a process similar to the registration process detailed above in the description of FIG. 1. It is further contemplated that a user profile for the healthcare worker 316 has been created previously and is stored on the mobile computing device 318 in the data store 340 as part of the user profiles 343. The mobile computing device 318 can receive user credentials (e.g., a username and a password) from the healthcare worker 316 and can transmit the user credentials to the server computing device 302. The server EHR 308 can authenticate the healthcare worker 316 based upon the user credentials, and can provide the healthcare worker 316 with access to the functionality of the server EHR 308 via the client EHR 326 executing on the mobile computing device 318. The client EHR 326, via the authentication module 328, also utilizes the user credentials to cause a user profile for the healthcare worker 316 stored in the data store 340 to be loaded, wherein the client EHR 326 provides functionality in accordance with the user profile for the healthcare worker 316.

The client EHR 326 may then receive input from the healthcare worker 316 causing the client EHR 326 to perform a healthcare related task. Subsequently, it is contemplated that the client EHR 326 enters a suspended state of execution. For instance, the client EHR 326 may have a time-out limit of twenty minutes, and the client EHR 326 may fail to receive input from the healthcare worker 316 for a period of time exceeding twenty minutes, thereby causing the client EHR 326 to suspend execution.

Subsequently, it is contemplated that the healthcare worker 316 wishes to access the client EHR 326 again. The biometric input component 334 of the mobile computing device 318 may receive a biometric identifier for the healthcare worker 316 as input. The biometric input component 334 can cause the biometric identifier to be received by the authentication module 328 of the client EHR 326. Responsive to receiving the biometric identifier, the authentication module 328 can cause the biometric identifier to be received by the biometrics subsystem 330 of the operating system 324 of the mobile computing device 318, whereupon the biometrics subsystem 330 can authenticate the healthcare worker 316 based upon the biometric identifier. More specifically, the biometrics subsystem 330 may cause a comparison of the biometric identifier to be performed with an encrypted biometric identifier stored in the secure memory 344 during the registration process (described above in FIG. 1). In an example, the biometric identifier matches the (encrypted) biometric identifier stored in the secure memory 344, and the biometrics subsystem 330 can cause a message to be received by the authentication module 328, the message indicating that the biometric identifier for the healthcare worker 316 has been authenticated.

Responsive to receiving the message, the authentication module 328 can cause the short-range communication component 350 of the mobile computing device 318 to scan for an identifier for the healthcare worker 316 or an identifier for the wearable device 352 that is being emitted from the short-range communication component 354 of the wearable device 352. Responsive to detecting the identifier for the healthcare worker 316 (or the identifier for the wearable device 352), the authentication module 328 can authenticate the healthcare worker 316 based upon the identifier for the healthcare worker 316 (or the identifier for the wearable device 352. More specifically, the authentication module 328 determines that the identifier for the healthcare worker 316 (or the wearable device 352) has been previously registered with the mobile computing device 318. Responsive to determining that the identifier for the healthcare worker 316 (or the wearable device 352) has been previously registered with the mobile computing device 318, the authentication module 328 also identifies a user profile for the healthcare worker 316 based upon the identifier for the healthcare worker 316.

The authentication module 328 may then cause a second message to be received by the client EHR 326, wherein the second message causes the client EHR 326 to resume execution under the user profile for the healthcare worker 316, thereby providing the healthcare worker 316 with access to functionality of the client EHR 326 in accordance with the user profile.

In the event that the short-range communication component 350 of the mobile computing device 318 detects a second identifier for a second healthcare worker (e.g., a healthcare worker that also utilizes the mobile computing device 102) being emitted from a second wearable computing device worn by the second healthcare worker, the mobile computing device 318 may present a prompt on the display of the mobile computing device 318, wherein the prompt indicates that additional access credentials (e.g., a username and a password) of the healthcare worker 316 are required in order to disambiguate the healthcare worker 316 from the second healthcare worker. The mobile computing device 318 can receive the additional access credentials as input from the healthcare worker 316, and the mobile computing device 318 can identify a user profile for the healthcare worker 316 based on the additional access credentials as well as the identifier for the wearable device 352. Additionally or alternatively, RSSI (described above) may also be employed to disambiguate the healthcare worker 316 from the second healthcare worker.

In an embodiment where a healthcare related task performed by the client EHR 326 requires additional security (e.g., prescribing a controlled substance), the authentication module 328 can also cause a prompt indicating that additional access credentials (e.g., a username and password, a second biometric identifier, etc.) of the healthcare worker 316 are required to be presented on the display 336. The mobile computing device 318 can then receive the additional access credentials from the healthcare worker 316, and can authenticate the healthcare worker 316 based upon the additional access credentials.

While the authentication module 112 and the authentication module 328 have been described above as modules to the mobile application 110 and the client EHR 326, respectively, other possibilities are contemplated. For instance, functionality of the authentication module 112 and/or the authentication module 328 may be incorporated into an application separate from the mobile application 110 and the client EHR 326.

Figure 4:
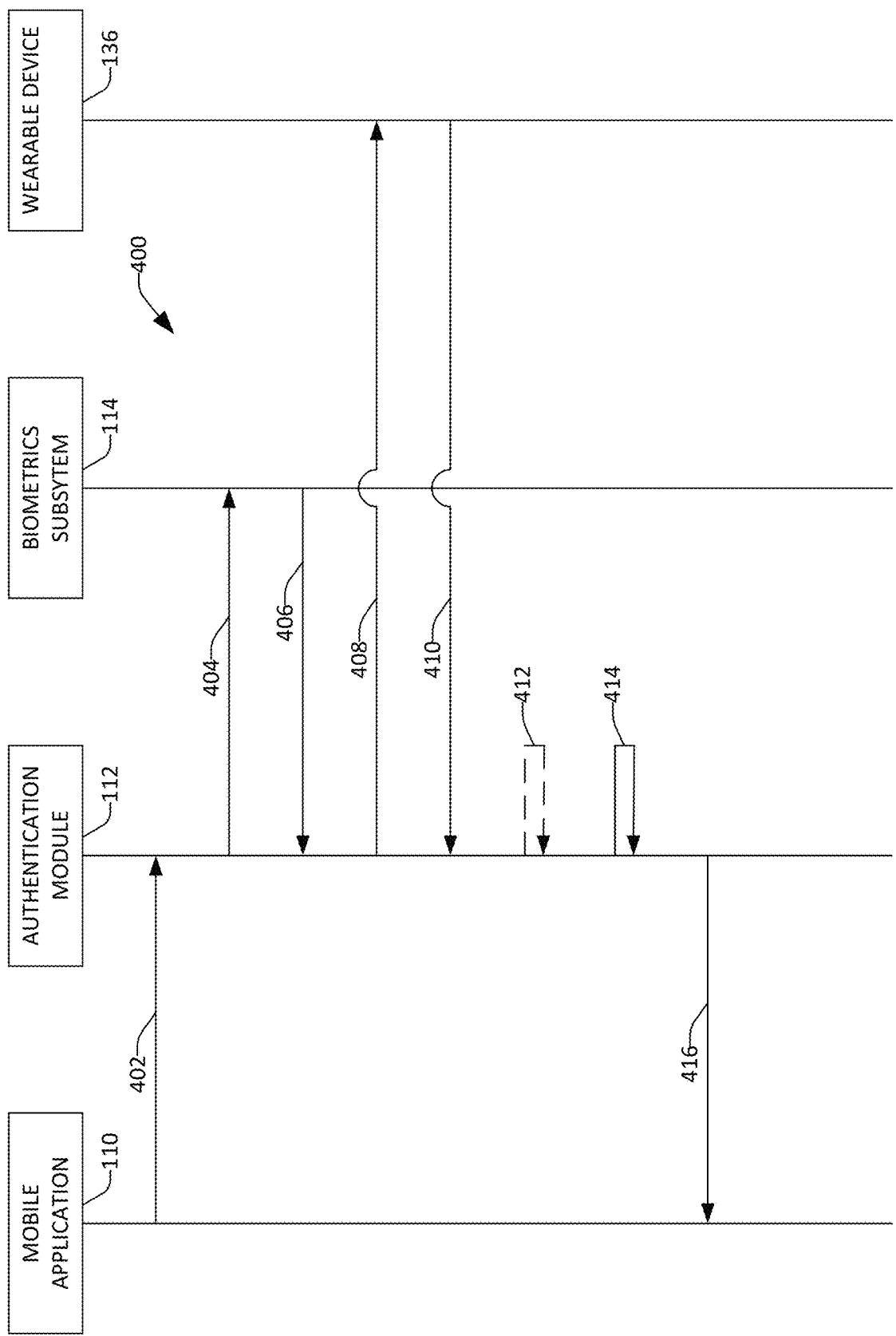
FIG. 4 illustrates a control flow diagram for authenticating a user of a mobile application executing on a mobile computing device.

Turning now to FIG. 4, an exemplary control flow diagram 400 for authenticating the user 134 of the mobile computing device 102 from amongst a plurality of users of the mobile computing device 102 is illustrated. At 402, the mobile application 110 receives a request to begin or resume execution of the mobile application 110 in the form of a biometric identifier for the user 134. At 404, the authentication module 112 causes the biometric identifier for the user 134 to be received by the biometrics subsystem 114. The biometrics subsystem 114 then authenticates the user 134 based upon the biometric identifier and an encrypted version of the biometric identifier for the user 134 that is stored on the mobile computing device 102. At 406, responsive to authenticating the user, the biometrics subsystem 114 causes a first message to be received by the authentication module 112. The first message indicates that authenticating the user 134 based on the biometric identifier was successful.

At 408, responsive to receiving the first message, the authentication module 112 causes the short-range communication component 132 of the mobile computing device 102 to scan for an identifier of the wearable device 136 that is being emitted by the wearable device 136. At 410, the authentication module 112 detects the identifier for the wearable device that is being emitted from the wearable device 136. The authentication module 112 then authenticates the user 134 based upon the identifier for the wearable device 136 and an encrypted version of the identifier for the wearable device 136 that is stored on the mobile computing device 102.

Optionally, at 412, the authentication module 112 requests and receives additional access credentials (e.g., a username and a password, a second biometric identifier, etc.) from the user 134. The authentication module 112 further authenticates the user 134 based upon the additional access credentials. At 414, the authentication module 112 identifies a user profile for the user 134 based upon the identifier for wearable device 136 (and optionally the additional access credentials). At 416, the authentication module 112 causes an indication to be received by the mobile application 110, thereby causing the mobile application 110 to execute (or resume executing) in accordance with the user profile for the user 134.

Figure 5:
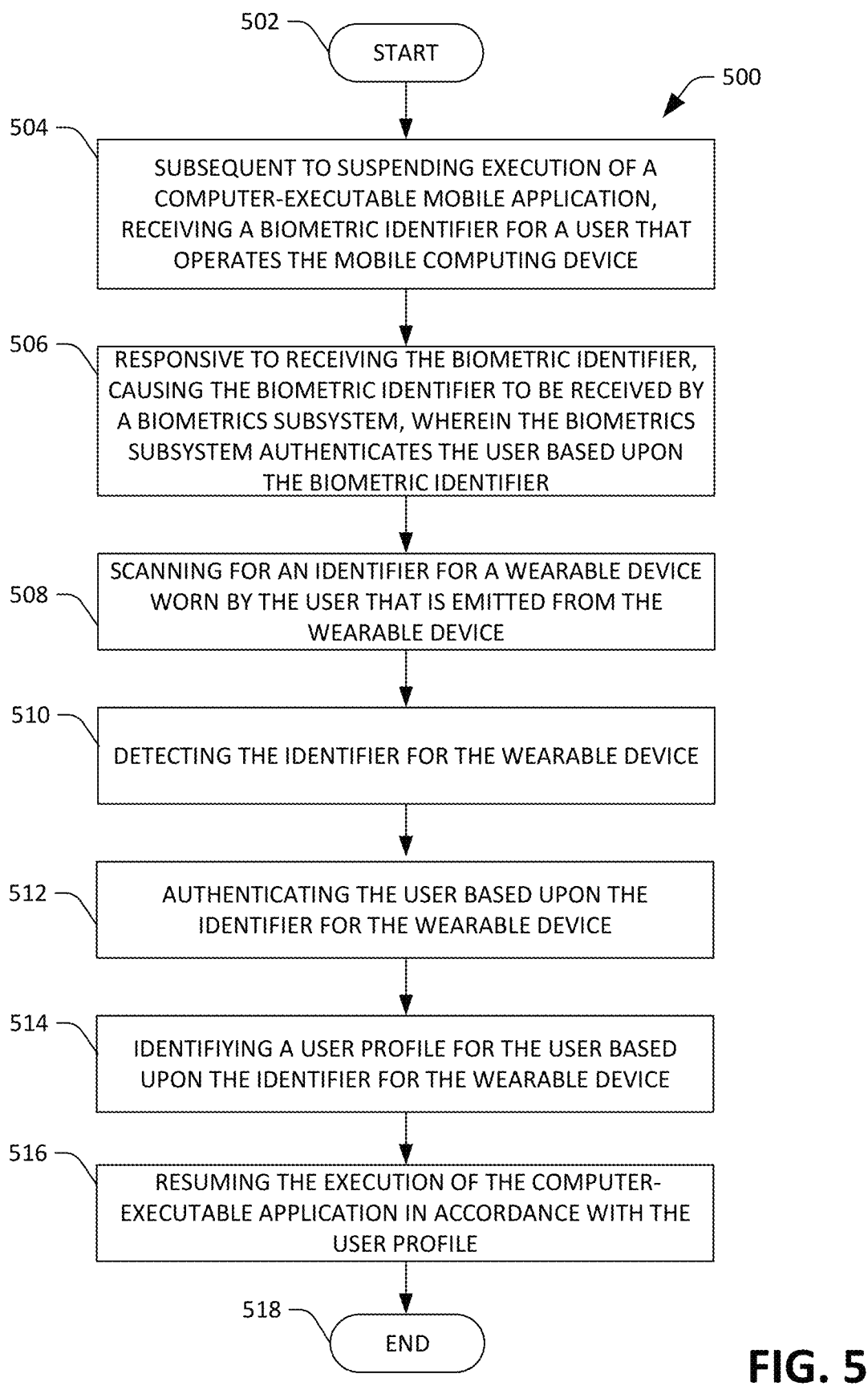
FIG. 5 is a flow diagram that illustrates an exemplary methodology performed by a mobile computing device that facilitates authenticating a user of a mobile application executing on the mobile computing device.

FIG. 5 illustrates an exemplary methodology relating to authenticating a user of a mobile application. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now to FIG. 5, a methodology 500 performed by a mobile computing device that facilitates authenticating a user that operates the mobile computing device from amongst a plurality of users of the mobile computing device is illustrated. The methodology 500 begins at 502, and at 504, the mobile computing device receives a biometric identifier for the user by way of a biometric input component comprised by the mobile computing device. At 506, responsive to receiving the biometric identifier, the mobile computing device causes the biometric identifier to be received by a biometrics subsystem of an operating system of the mobile computing device. The biometrics subsystem then authenticates the user based upon the biometric identifier.

At 508, the mobile computing device begins to scan, by way of a first short-range communication component comprised by the mobile computing device, for an identifier for a wearable device that is worn by the user. The identifier for the wearable device is being emitted from a second short-range communication component that is comprised by the wearable device. At 510, the mobile computing device detects, by way of the first short-range communication component, the identifier for the wearable device. At 512, the mobile computing device authenticates the user based upon the identifier for the wearable device. At 514, responsive to authenticating the user, the mobile computing device identifies, based upon the identifier for the wearable device, a user profile for the user from amongst a plurality of user profiles for the plurality of users stored in a data store of the mobile computing device. At 516, responsive to identifying the user profile, the mobile computing device provides the user with access to the mobile application in accordance with the user profile for the user. The methodology 500 concludes at 518.

Figure 6:
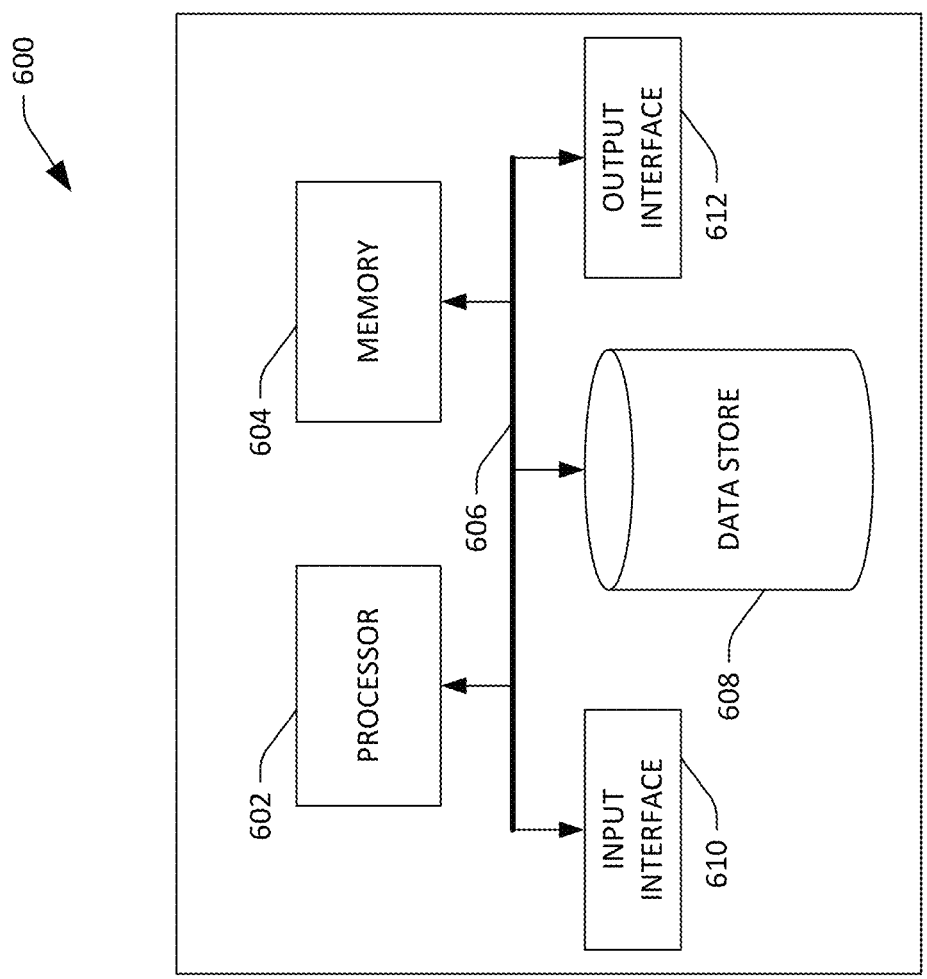
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that facilitates authenticating a user of a mobile application in a shared computing environment. By way of another example, the computing device 600 can be used in a system that facilitates authenticating a user of a client EHR. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store clinical data, user profiles, etc.

The computing device 600 additionally includes a data store 608 that is accessible by the processor 602 by way of the system bus 606. The data store 608 may include executable instructions, clinical data, user profiles, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile computing device comprising:
   a processor;
   a biometric input component that is operably coupled to the processor;
   a short-range communication component that is operably coupled to the processor; and
   memory storing instructions, wherein the instructions, when executed by the processor, are configured to cause the processor to perform acts comprising:
      receiving a biometric identifier for a user currently operating the mobile computing device by way of the biometric input component, wherein a plurality of biometric identifiers for a plurality of users of the mobile computing device are stored on the mobile computing device;
      responsive to receiving the biometric identifier, and at a biometrics subsystem of an operating system that is loaded in the memory of the mobile computing device, authenticating the user based upon the biometric identifier;
      responsive to authenticating the user, scanning, by way of the short-range communication component, for an identifier for a wearable device worn by the user, wherein the identifier for the wearable device is emitted from a second short-range communication component comprised by the wearable device;
      detecting, by way of the short-range communication component, the identifier for the wearable device that is emitted from the second short-range communication component;
      responsive to detecting the identifier for the wearable device, authenticating the user based upon the identifier for the wearable device that is emitted from the second short-range communication component; and
      subsequent to authenticating the user, providing the user with access to a computer-executable mobile application that executes on the mobile computing device.

2. The mobile computing device of claim 1, the acts further comprising:
   prior to receiving the biometric identifier for the user, receiving a username and a password for the user as input from the user;
   transmitting the username and the password to a server computing device that is in communication with the mobile computing device by way of a network, wherein the server computing device authenticates the user based upon the username and the password; and
   receiving a message from the server computing device, wherein the message indicates that the server computing device has authenticated the user based upon the username and the password.

3. The mobile computing device of claim 1, wherein the biometric identifier for the user is a fingerprint scan of a fingerprint of the user, a speech sample of the user, a face scan of the user, or a retinal scan of a retina of the user.

4. The mobile computing device of claim 1, the acts further comprising:
   prior to scanning for the identifier for the wearable device and subsequent to causing the biometric identifier to be received by the biometrics subsystem of the operating system, receiving a message from the biometrics subsystem, wherein the message indicates that the biometrics subsystem has authenticated the user.

5. The mobile computing device of claim 1, the acts further comprising:
   prior to authenticating the user based upon the identifier for the wearable device and subsequent to scanning for the identifier for the wearable device, detecting an identifier for a second wearable device worn by a second user in the plurality of users that is emitted from a third short-range communication component comprised by the second wearable device;
presenting a prompt on a display of the mobile computing device, wherein the prompt indicates that additional access credentials of the user are required; and
responsive to receiving the additional access credentials as input from the user, authenticating the user based upon the additional access credentials.

6. The mobile computing device of claim 1, wherein a second wearable device worn by a second user in the plurality of users is emitting an identifier for a second wearable device from a third short-range communication component comprised by the second wearable device, the acts further comprising:
disambiguating the user from the second user employing a received signal strength indicator (RSSI) methodology.

7. The mobile computing device of claim 1, the acts further comprising:
prior to causing the execution of the computer-executable mobile application and subsequent to authenticating the user based upon the identifier for the wearable device, identifying, based upon the identifier for the wearable device, a user profile for the user from amongst a plurality of user profiles for the plurality of users stored in a data store of the mobile computing device, wherein the computer-executable mobile application provides functionality in accordance with the user profile.

8. The mobile computing device of claim 1, wherein the short-range communication component is a first Bluetooth transceiver or a radio frequency identification receiver, wherein the second short-range communication component is a second Bluetooth transceiver or a radio frequency identification tag.

9. The mobile computing device of claim 1, wherein the wearable device comprises a health monitoring component, wherein the health monitoring component captures health information of the user, wherein the wearable device transmits the health information of the user to the mobile computing device, the acts further comprising:
changing an appearance of the computer-executable mobile application on a display of the mobile computing device based upon the health information of the user.

10. The mobile computing device of claim 1, the acts further comprising:
prior to receiving the biometric identifier for the user, causing an encrypted version of the biometric identifier to be stored in secure memory comprised by the mobile computing device, wherein the biometrics subsystem authenticates the user further based upon the encrypted version of the biometric identifier.

11. The mobile computing device of claim 1, the acts further comprising:
prior to receiving the biometric identifier for the user, receiving the identifier for the wearable device by way of the short-range communication component; and
causing an encrypted version of the identifier for the wearable device to be stored on the mobile computing device, wherein authenticating the user is further based upon the encrypted version of the identifier for the wearable device.

12. A method executed by a processor of a mobile computing device, the method comprising:
receiving a biometric identifier for a user currently operating the mobile computing device by way of a biometric input component comprised by the mobile computing device, wherein a plurality of biometric identifiers for a plurality of users of the mobile computing device are stored on the mobile computing device;
responsive to receiving the biometric identifier, and at a biometrics subsystem of an operating system that is loaded in the memory of the mobile computing device, authenticating the user based upon the biometric identifier;
scanning, by way of a first short-range communication component comprised by the mobile computing device, for an identifier for a wearable device worn by the user that is emitted from a second short-range communication component comprised by the wearable device;
detecting, by way of the first short-range communication component, the identifier for the wearable device that is emitted from the second short-range communication component;
authenticating the user based upon the identifier for the wearable device that is emitted from the second short-range communication component;
responsive to authenticating the user based upon the identifier for the wearable device, identifying, based upon the identifier for the wearable device, a user profile for the user from amongst a plurality of user profiles for the plurality of users stored in a data store of the mobile computing device; and
responsive to identifying the user profile, providing the user with access to a computer-executable mobile application that executes on the mobile computing device, wherein functionality of the computer-executable mobile application is provided in accordance with the user profile for the user.

13. The method of claim 12 further comprising:
prior to receiving the biometric identifier for the user, receiving a username and a password for the user as input; and
transmitting the username and the password to a server computing device that is in communication with the mobile computing device by way of a network, wherein the server computing device authenticates the user based upon the username and the password, thereby causing the mobile computing device to begin the execution of the computer-executable mobile application.

14. The method of claim 12 further comprising:
prior to authenticating the user based upon the identifier for the wearable device and subsequent to scanning for the identifier for the wearable device, detecting an identifier for a second wearable device worn by a second user in the plurality of users that is emitted from a third short-range communication component comprised by the second wearable device;
presenting a prompt on a display of the mobile computing device, wherein the prompt indicates that additional access credentials of the user are required; and
responsive to receiving the additional access credentials as input from the user, authenticating the user based upon the additional access credentials.

15. The method of claim 12 further comprising:
prior to receiving the biometric identifier for the user, causing an encrypted version of the biometric identifier to be stored in secure memory comprised by the mobile computing device, wherein the biometrics subsystem authenticates the user further based upon the encrypted version of the biometric identifier.

16. The method of claim 12 further comprising:
prior to receiving the biometric identifier for the user, receiving the identifier for the wearable device by way of the first short-range communication component; and
causing an encrypted version of the identifier for the wearable device to be stored on the mobile computing device, wherein authenticating the user is further based upon the encrypted version of the identifier for the wearable device.

17. The method of claim 12, wherein the biometric identifier for the user is a fingerprint scan of a fingerprint of the user, a speech sample of the user, a face scan of the user, or a retinal scan of a retina of the user.

18. The method of claim 12, wherein the biometric input component is a fingerprint scanner, a camera, or a microphone.

19. The method of claim 12, wherein the computer-executable mobile application is a client electronic health records application (client EHR).

20. A computer-readable storage medium comprising instructions that, when executed by a processor of a mobile computing device, cause the processor to perform acts comprising:
receiving a biometric identifier for a user currently operating the mobile computing device by way of a biometric input component comprised by the mobile computing device, wherein a plurality of biometric identifiers for a plurality of users are stored on the mobile computing device;
responsive to receiving the biometric identifier, and at a biometrics subsystem of an operating system that is loaded in the memory of the mobile computing device, authenticating the user based upon the biometric identifier;
scanning, by way of a first short-range communication component comprised by the mobile computing device, for an identifier for the user that is emitted from a second short-range communication component comprised by a wearable computing device worn by the user;
detecting, by way of the first short-range communication component, the identifier for the user that is emitted from the second short-range communication component;
authenticating the user based upon the identifier for the user that is emitted from the second short-range communication component; and
responsive to authenticating the user based upon the identifier for the user, identifying, based upon the identifier for the user, a user profile for the user from amongst a plurality of user profiles for the plurality of users stored in a data store of the mobile computing device; and
responsive to identifying the user profile, providing the user with access to a computer-executable mobile application that executes on the mobile computing device, wherein functionality of the computer-executable mobile application is provided in accordance with the user profile for the user.

* * * * *